United States Patent
Zhu

(10) Patent No.: US 7,430,290 B2
(45) Date of Patent: Sep. 30, 2008

(54) VIRTUAL QUEUING SUPPORT SYSTEM AND METHOD

(75) Inventor: Zhongwen Zhu, Saint-Laurent (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1062 days.

(21) Appl. No.: 10/690,514

(22) Filed: Oct. 23, 2003

(65) Prior Publication Data
US 2005/0089053 A1    Apr. 28, 2005

(51) Int. Cl.
*H04M 3/00* (2006.01)

(52) U.S. Cl. ............... 379/265.01; 379/265.02; 379/265.03; 379/265.06; 379/265.14; 379/266.01; 379/266.03; 379/266.04; 379/266.06; 379/309

(58) Field of Classification Search ............ 379/265.01, 379/265.02, 265.03, 265.06, 265.14, 266.01, 379/266.03, 266.04, 266.06, 309
See application file for complete search history.

(56) References Cited

U.S. PATENT DOCUMENTS

| 6,314,177 | B1 | 11/2001 | Davis et al. ............ | 379/265.12 |
| 6,449,646 | B1 * | 9/2002 | Sikora et al. ............ | 709/226 |
| 7,272,223 | B2 * | 9/2007 | McCormack et al. ..... | 379/265.09 |
| 2002/0018554 | A1 | 2/2002 | Jensen et al. ............ | 379/265.01 |

FOREIGN PATENT DOCUMENTS

| EP | 0 419 285 A2 | 3/1991 |
| EP | 1 296 502 A2 | 3/2003 |
| WO | 93/04447 | 3/1993 |
| WO | 00/05867 | 2/2000 |
| WO | 00/35173 A1 | 6/2000 |

OTHER PUBLICATIONS

Telecorp Product Inc.: "Managing your call center", XP002320877, retrieved on Mar. 9, 2005, pp. 1-54.
International Search Report for PCT/IB2004/052170 dated Mar. 23, 2005.

* cited by examiner

*Primary Examiner*—Quynh H Nguyen
(74) *Attorney, Agent, or Firm*—Alex Nicolaescu; Ericsson Canada Inc.

(57) ABSTRACT

A method and a Virtual Queuing Support System (VQSS) for optimizing end-user service for clients waiting for a service request to be responded and who are registered in various virtual queues of the VQSS. End-users register in a virtual queue of the VQSS, which monitors the status of the queues and the status of the service agents. When a parameter such as the number of users in a queue or the expected waiting time exceeds a pre-set threshold, the VQSS reassigns end-users from the problematic queue, and/or re-assigns service agents from other queues to the problematic queue. The VQSS comprises a memory storing the virtual queues, and a processor for managing the virtual queues.

16 Claims, 3 Drawing Sheets

VIRTUAL QUEUING SUPPORT SYSTEM AND METHOD

BACKGROUND OF THE INVENTION

1. Field of the Invention

The present invention relates to the field of virtual queue management.

2. Description of the Related Art

Service companies such as local cable companies and governmental agencies offer various customer support services that can be accessed via a telephone network, such as the Public Switched Telecom Network (PSTN) and the Public Local Mobile Network (PLMN). In most cases, the clients in need for a service (also called herein the customer or end-user) can dial the phone number of the company's service line to talk to a service agent or operator. As service companies tend to maximize service provided to customers while minimizing cost, typically one service agent must respond to plural service requests from a plurality of clients. This situation creates service lines, or queues, where customers await for the next available service agent to respond their call. During this period, clients have to wait on the phone line, sometimes for a long time before they are served. Moreover, clients are provided no information about what is going on in the remote customer support center.

In a variant of the existing customer support services, a calling client can receive a busy signal or indication when the support service queue reaches its full capacity. The busy signal can be, for example, playing background music with advertisement, dynamically indicating the predicted waiting time, offering the client the option to receive a notification in a specified period, e.g. 30 minutes (however, the customer has no choice for selecting the time duration for the notification). In other words, customers have little choice, if any, to take a decision based upon the information they receive from the remote support center. Hence, in order to keep their priority most customers end up hooking with phone lines until they are served.

Other customer support service systems provide plural services, and calling customers, depending upon their needs, are selectively arranged in a queue for each one of the service provided by the system. For example, a calling customer A may desire to extend the validity of his driver's license, and when he calls the service telephone line of the governmental driver agency, he selects option 1 on his touch tone telephone, which signal is interpreted by a Dual Tone Multiple Frequency (DTMF) system in the customer support service system as corresponding to a first service queue. On the other hand, a customer B desires to obtain a new driver's license, and selects option 2 on his touch tone telephone when he calls the same service telephone line and is therefore assigned to a second, different queue. Each client is thus arranged in the proper queue based on the selected desired service. However, as new clients call in for similar services, the queues may increase indefinitely, thus creating, at best, decrease in the service quality provided by the serving agents as the waiting time increases, or at worst, an overflow of the telephone servicing system as the maximum number of queued customers is reached.

Although there is no prior art solution as the one proposed hereinafter for solving deficiencies or current customer client systems, the PCT patent application WO 2000/05867 A1 to Williams P. M. assigned to British Telecom (herein called Williams) bears some relation with the field of the present invention. In Williams, the queuing time for multiple customers whose calls are arranged in queue is calculated and then informed to each customer. The customer connection is released in response to a signal from the customer. The connection is re-established if the queuing time of a particular customer is less than a threshold value. The queuing time is announced to a customer upon request, and all incoming calls in queue are compared to a data identifying the origin of the call. If multiple calls are detected to be from the same source, the call scheduled for reconnection is merged with other duplicate calls.

Williams fails to address the issue of simultaneously managing multiple virtual queues, and is silent on any method for optimizing the service response time of such multiple virtual queues.

In the PCT patent application WO 1993/04447 to Caine L. S., assigned to Delphi Displays Ltd (herein called Caine), there is taught a queue management system including a system controller, ticket dispensing machines with display monitors, an assistant or operator control panel and information displays for both assistant and customer information. All the elements of the system are linked to the controller. The displays are located at strategic intervals around a store, as are the ticket dispensing machines. The ticket dispenser monitors provide the customers with an indication of the expected waiting time. As tickets are taken from the dispensers the controller increments the number to be printed on the next ticket. Assistants are provided with a button to press when ready to serve the next customer causing this information to be relayed to the information displays.

Caine also fails to address the issue of simultaneously managing multiple virtual queues and stops short of proposing any method for optimizing the service time of such multiple virtual queues.

In the EP patent application number 0 419 285 to McGuire et al. assigned to Radford of Bristol Ltd (herein called McGuire), a customer queue management system is disclosed wherein the various components are connected via transmitter/receiver links. The occurrence of each new arrival is recorded, possibly with the issue of a ticket. One or more displays indicate a number relating to the customer being served. A delay mechanism prevents the number being incremented too quickly. Remote control units increment the displayed number as queue members are serviced. A master control unit provides additional control, including immediate display advance and reset.

None of the above-described systems involves more than one single service queue and therefore, each described system is limited to providing information to queued customers about their relative position in the unique queue. Conclusively, the prior art is silent on a system and method for optimizing the processing time of a virtual queuing system that involves a plurality of queues.

Accordingly, it should be readily appreciated that it would be advantageous to have a method and system for effectively managing and for optimizing the processing time of a system with a plurality of queues. The present invention provides such a method and system.

SUMMARY OF THE INVENTION

In one aspect, the present invention is a method for optimizing end-user service using a Virtual Queuing Support System (VQSS), the method comprising the steps of: a) detecting a problematic situation associated with a virtual queue from a plurality of virtual queues; and b) taking an action for correcting the problematic situation; wherein the action comprises at least one of i) reassigning at least one end-user from the virtual queue associated with the problematic situation to another virtual queue from the plurality of virtual queues, and ii) reassigning at least one new service agent from one of the other queues of the plurality of virtual queues to the virtual queue associated with the problematic situation.

In another aspect, the present invention is a VQSS for optimizing end-user service, the VQSS comprising: a memory for storing a plurality of virtual queues; and a processor acting to detect a problematic situation associated with a virtual queue from a plurality of virtual queues and acting to take an action for correcting the problematic situation; wherein the action taken by the processor comprises at least one of i) reassigning at least one end-user from the virtual queue associated with the problematic situation to another virtual queue from the plurality of virtual queues, and ii) reassigning at least one new service agent from one of the other queues of the plurality of virtual queues to the virtual queue associated with the problematic situation.

BRIEF DESCRIPTION OF THE DRAWINGS

For a more detailed understanding of the invention, for further objects and advantages thereof, reference can now be made to the following description, taken in conjunction with the accompanying drawings, in which:

FIG. 3.b is another exemplary high-level logical representation of a second variant of the virtual queue optimization process performed by the VQSS according to the preferred embodiment of the present invention; and FIG. 3.c is yet another exemplary high-level logical representation of the second variant of the virtual queue optimization process performed by the VQSS according to the preferred embodiment of the present invention.

DETAILED DESCRIPTION OF THE PREFERRED EMBODIMENTS

Figure 1:
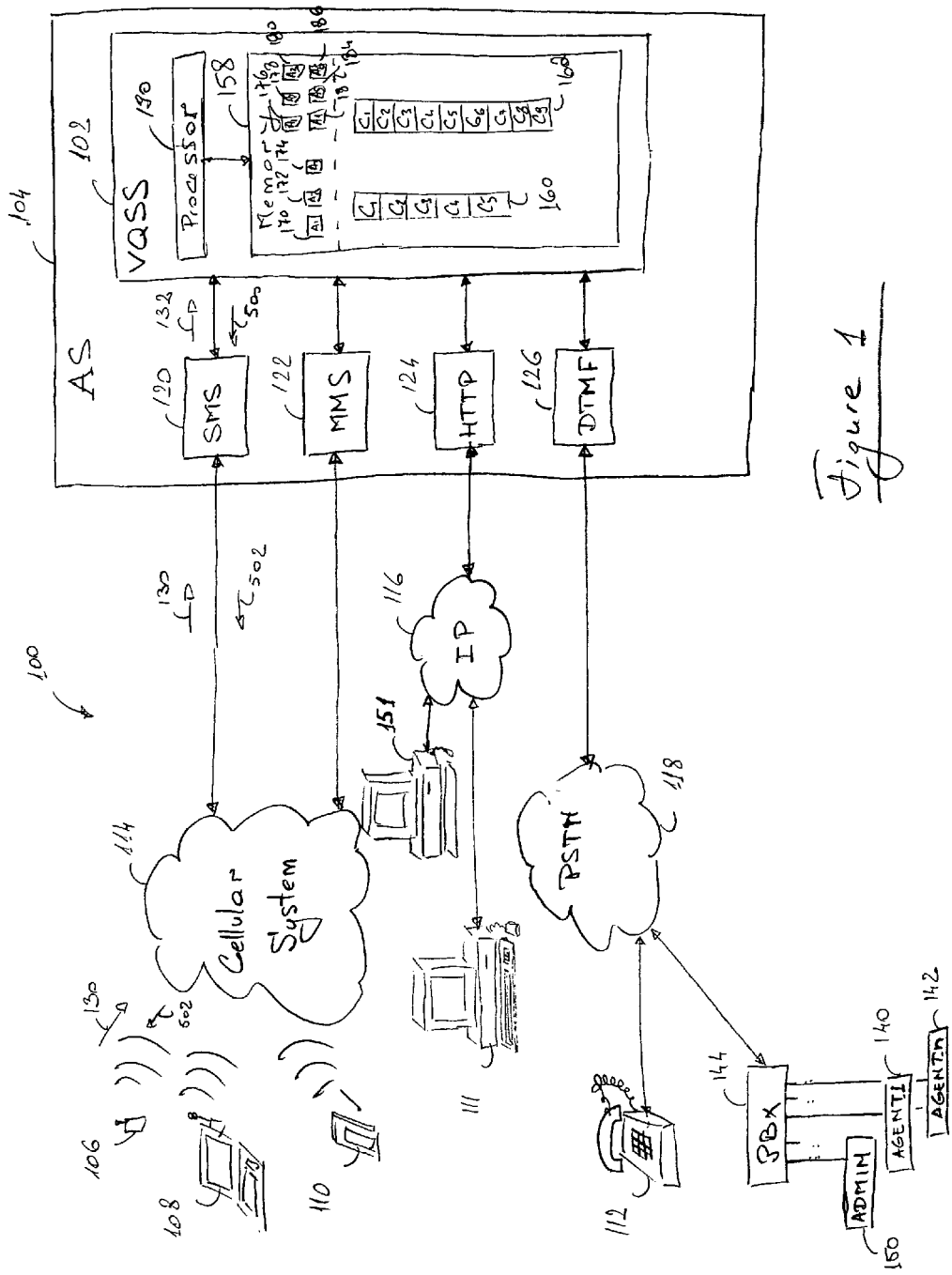
FIG. 1 is an exemplary high-level block diagram of a telecommunications system implementing a Virtual Queuing Support Service (VQSS) according to the preferred embodiment of the present invention.

The innovative teachings of the present invention will be described with particular reference to various exemplary embodiments. However, it should be understood that this class of embodiments provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the drawings, like or similar elements are designated with identical reference numerals throughout the several views.

The present invention provides a method and a Virtual Queuing Support Service (VQSS), which allows an optimization of the virtual queues for the end-users (also referred herein as clients, users, or customers) who register with the VQSS, in order to reduce the waiting time for the requested service. The invention can be applied, for example, both in an Internet online service provision environment, in a telephone-based service support environment, or in a traditional face-to-face service provision environment. Accordion to the invention, users first register with the VQSS system, which can be performed through various means, such as for example via a phone system (e.g. cellular system or PSTN) using either SMS, MMS, or voice, through the Internet, through local registration at the premises of the service provision, or through any other suitable communication link to the VQSS. Following registration, end-users are assigned a position in the appropriate virtual queue, i.e. for example a virtual queue that corresponds to the requested service, and can be provided information regarding the status of their queue, such as for example the expected waiting time, the average serving time per user, of the number off users register before a given clients, etc.

According to the present invention, service support agents who answer and process the service requests of the end-users also register with the VQSS so that the later can have up-to-date information regarding the number and the identity of the available support agents who currently work to respond to and process end-users requests. Depending upon a particular implementation, service support agents can also register with the VQSS through one or more of the various means enumerated beforehand with respect to the end-users registration.

Finally, according to the invention a service administrator of the VQSS is responsible for the overall configuration of the VQSS system including configuring the services the VQSS can support, configure the security role for both service support agents and end-users, configure various thresholds for each queue including, for example, the maximum number of clients allowed for each service queue or the maximum expected waiting time for each such queue.

According to the preferred embodiment of the present invention, the VQSS that services a plurality of a virtual queues dynamically assigns and rearranges the virtual queues to optimize the service quality, for example by re-assigning service support agents to individual virtual queues, or clients to other queues, in order to serve end-users in an optimal way, i.e. fast, efficient, and satisfactory. Such optimization is possible based on the input received from both the registered service end-users and service support agents of the given VQSS. The later is provided with information every time a registered service agent begins and terminates servicing a given end-user. It becomes therefore possible for the VQSS to use this information in combination with queuing information (e.g. the number of clients any each queue) in order to calculate the current average serving time and the expected longest waiting time for each queue. For example, if the expected waiting time for a given queue exceeds a given thresholds representing the maximum allowed waiting time, the VQSS can dynamically reassign service agents that serve clients from another queue which waiting time is not critical to serve end-users from the identified problematic virtual queue. Alternatively, if a threshold regarding the number of clients in a given virtual queue is exceeded, or the maximum expected waiting time for the last client of a queue is exceeded, that client can be re-assigned to another, shorter, virtual queue.

According to the present invention, various thresholds can be set for each individual virtual queue of the VQSS, and can be continuously monitored throughout the service duration (e.g. for the duration of the business hours 9:00 Am to 5:00 PM). When such a threshold for a given queue is reached or exceeded, the VQSS dynamically starts a virtual queues optimization process in order to correct the situation. Therefore, the present invention allows for continuous optimized waiting time in the system comprising a plurality of the virtual queues.

Reference is now made to FIG. 1, which is an exemplary high-level block diagram of a telecommunications system 100 implementing a VQSS system 102 according to the preferred embodiment of the present invention. Shown in FIG. 1 is first the VQSS system 102 that may be implemented advantageously in an Application Server (AS) 104 which is part of the telecommunications system 100, wherein the AS 104 is responsible to provide access to the service of the VQSS for end-users that desire to register with the VQSS.

According to the preferred embodiment of the invention, the VQSS 102 may be provided with one or more identifiers, such as for example, a telephone number, an IP address, or an HTTP address on the Internet, which can be publicized by a given business (e.g. the cable company) so that calling end-users can access the VQSS when they desire to place a service request. Shown in FIG. 1 are end-users 106-112 who can access the VQSS 102 through various means, including via a cellular system 114, via the Internet 116, or a PSTN system 118. The AS 104 may comprise corresponding communication interfaces 120-126 that act to transform the messages received from the external communication means 114, 116, 118 into a language understood by the VQSS system 102. For example, the end-user 106 may lire-up on the business premises of a local cable company in order to request activation of cable television for this private home. For this purpose, the end-user 106 may register with the VQSS 102 in a virtual queue for that service via the cellular system 114, by sending a registration SMS message 130 to the VQSS associated with the local cable company, which is received by the SMS interface 120 of the AS 104 and converted into a registration message format 132 understood by the VQSS 102. Upon receipt of message 132, the VQSS 102 acts to put the end-user in the appropriate virtual queue. Likewise, all end-users can connect through the means of their choice for registering a virtual queue of the VQSS, and communication interfaces 120-126 act to convert the individual registration messages received from the end-users into a form understood by the VQSS system 102. Also connected to the VQSS 102, are one or more service agents 140 and 142, which in the present exemplary scenario are connected via a PBX 144 and a PSTN 118 to the VQSS system 102. The DTMF interface 126 of the AS 104 converts messages received from the agents 140 and 142 into a form understood by the VQSS 102. Finally, a service administrator 150 responsible for the management of the VQSS system 102 may connect to the same PBX 144 and PSTN 118 to the VQSS 102, or alternatively and preferably, an administrator 151 can connect to the VQSS 102 via an HTTP interface over the Internet 116.

During normal function, the VQSS system 102 receives a plurality of registrations from the end-users 106-112, and based on these registrations requested by each end-user, registers the later in an appropriate virtual queue. The Virtual queues of the VQSS system 102 are comprised in a VQSS memory 158. Illustrated in FIG. 1 are two separate exemplary virtual queues 160 and 162, which contain five (5) and respectively nine (9) end-users. It is understood that for example, each one of the virtual queues 160 and 162 may correspond to a different service being provided by the service agents 140 and 142, or may be different types of virtual queues, such as for example a priority queue where subscribers pay for receiving a given service and, respectively, a regular queue where service is provided free of charge. In the present exemplary scenario three (3) service agents 170-174 are assigned to process service requests from the clients of the queue 160, while six (6) other service agents 176-186 are assigned to process service requests from the queue 162. Also, processor 190 is responsible for processing registrations alike registration 132, and for the management of the virtual queues 160 and 162. For example, processor 190 is responsible for the actions performed on the virtual queues in the manner that is yet to be described with reference to FIGS. 2 and 3.

Figure 2:
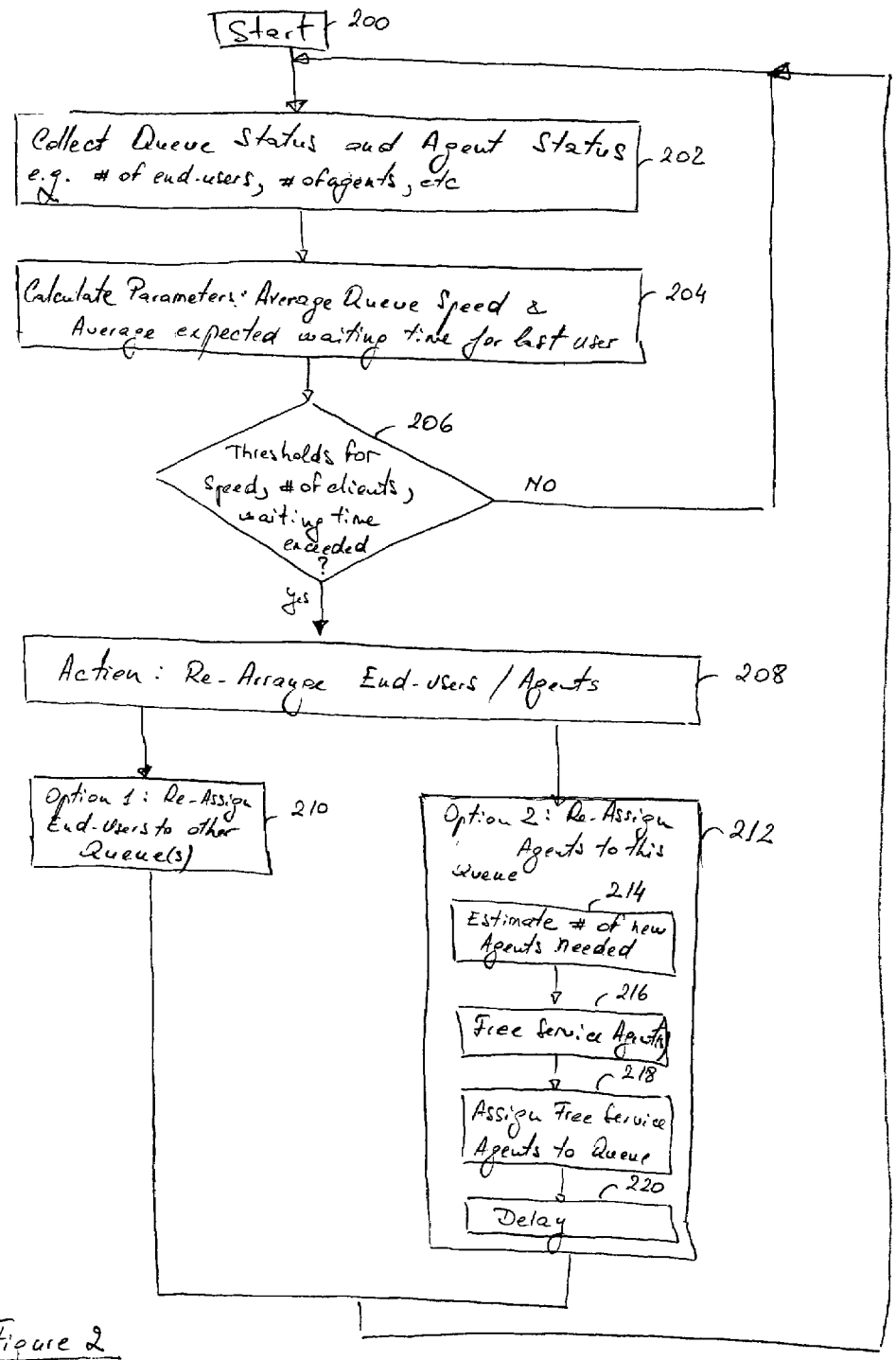
FIG. 2 is an exemplary flowchart diagram representing a virtual queue optimization process performed by the VQSS according to the preferred embodiment of the present invention.

Reference is now made to FIG. 2, which is an exemplary flowchart diagram representing a virtual queue optimization process performed by the VQSS system 102 according to the preferred embodiment of the present invention. The virtual queue optimization process of FIG. 2 starts in action 200. In action 202, the processor of the VQSS system collects the queue status for each one of its virtual queues as well as the service agents status. For example, action 202 may comprise collecting the number of end-users registered in each virtual queue as well as the number of registered service agents assigned for processing service requests for each such virtual queue. In action 204, the processor of the VQSS calculates various parameters for the virtual queues, such as for example the average queue speed for each virtual queue, and/or the average expected waiting time for the last user of each such virtual queue. It is understood that the reason why the processor of the VQSS calculates the average expected waiting time for the last user of each queue is that this user's waiting time is the longest with respect to the other users of the same queue.

The Average Queue Speed (AQS) for a given time interval (e.g. one hour) can be calculated by the VQSS in action 204 are as follows:

AQS of Queue=Nb of processed clients/hour

On the other hand, the Average Expected Waiting Time (AEWT) for a given end-user can be calculated by the VQSS an action 204 are as follows:

AEWT of the $n^{th}$ user of the Queue=n/AQS of Queue while the AEWT of the last user (e.g. the $9^{th}$ user) of the queue is:

AEWT of the $9^{th}$ user of the Queue=9/AQS of Queue

In action 206, the VQSS processor determines if any one of the parameters calculated in the action 204 exceeds a given pre-set threshold. Such thresholds may be set during the VQSS configuration phase by the VQSS administrators 150 or 151. Action 206 may comprise, for example, determining whether the average queue speed of each queue of the VQSS is below its pre-set threshold, and/or if the average expected waiting time for the last user of a given queue exceeds a given threshold, and/or if the number of end-users in a given virtual queue exceeds the predefined threshold. If the given threshold is not exceeded, then the process returns to the beginning, and is continuously repeated, so that the status of the VQSS' virtual queues is constantly monitored. Otherwise, if one or more of the given thresholds are exceeded, the VQSS processor takes action 208 in order to correct the situation. As a first option, in action 210, the VQSS system may reassign the end-users, which calculated expected waiting time exceeds the predefined threshold, to other virtual queues of the VQSS. For example, in action 210, the VQSS processor may reassign the last two users of a queue, which expected waiting time exceeds the maximum allowed waiting time threshold, to another virtual queue, which may be shorter than the identified programmatic virtual queue.

Alternatively or concomitantly, in action 212, the VQSS may reassign service agents to the problematic virtual queue identified in action 206. For example, in action 212, the VQSS may first estimate the number of new agents needed to correct the problematic situation, action 214. This may be calculated by the VQSS processor in various ways, such as for example starting with determining the average processing time for each service agent. The VQSS processor may further determine the number of service agents, and which service agents are required to correct, during a given period of time, e.g. 10 minutes, the problem identified in action 206. In action 216, the VQSS processor may act to free one or more service agents from their current duties. For example, action 216 may comprise reassigning one or more service agents which current duty is to serve a given queue to the problematic queue. Finally, in action 218, the freed service agents are assigned to the programmatic queue. Following the assignment of new service agents to the programmatic queue, the VQSS waits for a certain period of time, action 220, before returning to the beginning of the optimization process, in order to allow a certain amount of time to the newly assigned a service agents to process a number of clients from the programmatic queue to improve the problematic situation detected in action 206.

The optimization process represented in FIG. 2 can be repeated at given intervals during the service provision, or being run continuously. It is expected that the present optimization process can optimise the maximum expected waiting time for a given user in a virtual queue managed by the VQSS and increase the average virtual queue speed when problematic conditions are detected.

Figure 3A:
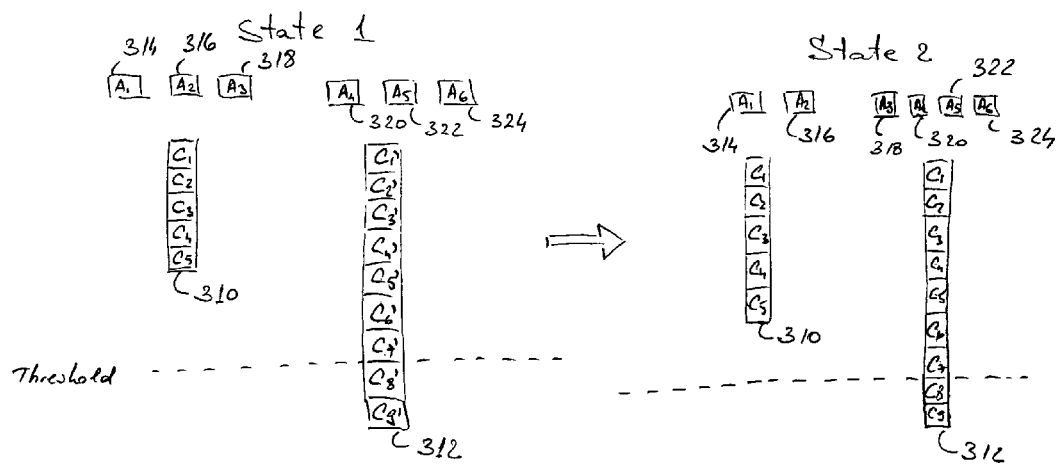
FIG. 3.a is an exemplary high-level logical representation of a variant of the virtual queue optimization process performed by the VQSS according to the preferred embodiment of the present invention.
Figure 3B:
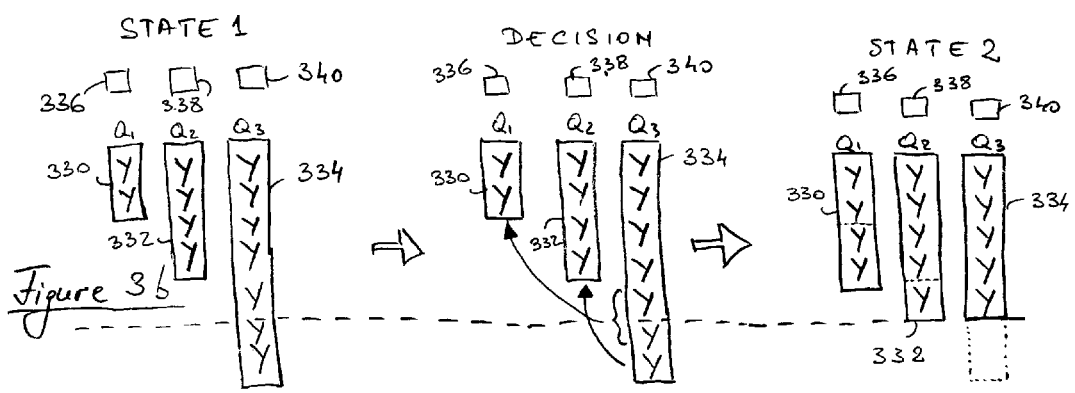
Figure 3C:
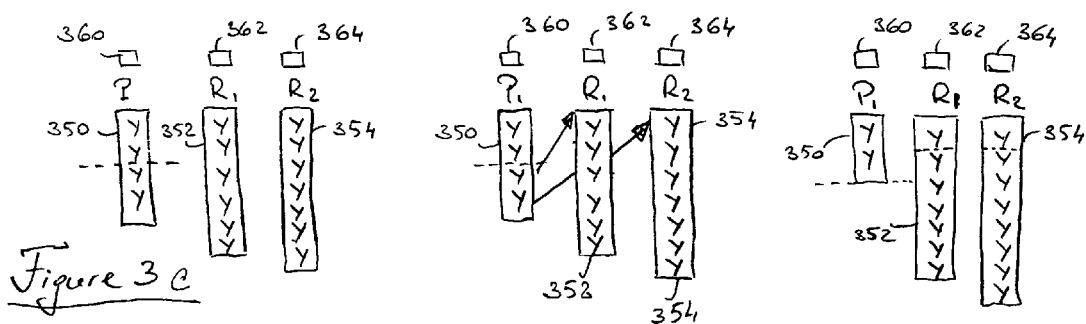

Reference is now made to FIG. 3.*a*, which is an exemplary high-level logical representation of the virtual queue management process performed by the VQSS 102 according to the preferred embodiment of the present invention, wherein new service agents are assigned to an identified problematic virtual queue in order to improve the service request processing time and thus reduce the queue. Shown in FIG. 3.*a* is an initial state (State 1) of two virtual queues 310 and 312 managed by the VQSS system. The first virtual queue 310 comprises five (5) clients whom service requests are to be treated by a pool of three (3) different service agents 314, 316, and 318. On the other hand, the virtual queue 312 comprises nine (9) clients, which service requests are to be treated by a pool of another three (3) different service agents 320, 322, and 324. It is also assumed, that the VQSS system that manages the virtual queues 310 and 312 comprises a pre-set threshold that triggers the optimization process every time more than seven (7) clients are detected in a given virtual queue, which is the case in the present scenario with queue 312 that comprises nine (9) queued clients. Therefore, the VQSS system detects the problematic situation of queue 312 represented in the initial state (States 1) of FIG. 3.*a*, in a manner similar to the one described beforehand with reference to FIG. 2, because the queue 312 has 9 clients. In order to increase the treatment of clients from the problematic virtual queue 312, the VQSS system then dynamically reassigns one of the service agents of the pool of service agents originally assigned to the virtual queue 310 to the pool of service agents treating the problematic virtual queue 312. The final status (State 2) of the queues 310 and 312 is represented in FIG. 3.*a*, wherein the pool of service agents assigned to the virtual queue 312 now comprises four (4) service agents, i.e. service agents 318, 320, 322, and 324. Consequently, following the optimization process of the present invention, the processing to service requests of clients from queue 312 is increased, and the treatment time of the virtual queue 312 is expected to decrease.

Reference is now made to FIG. 3.*b*, which is an exemplary high-level logical representation of the virtual queue management process performed by the VQSS 102 according to the preferred embodiment of the present invention, wherein exceeding end-users of the virtual queue are assigned to another, shorter virtual queue. Shown in FIG. 3.*b* is an initial state (State 1) of three (3) virtual queues 330, 332, and 334 managed by the VQSS system. The first virtual queue 330 comprises two (2) clients whom service requests are to be treated by a service agent 336. The second virtual queue 332 comprises four (4) clients whom service requests are to be treated by another service agent 338. Finally, the virtual queue 334 comprises seven (7) clients, which service requests are to be treated by yet another service agent 340. It is also assumed, that the VQSS system that manages the virtual queues 330, 332, and 334 comprises a pre-set threshold that triggers an optimization process every time more than five (5) clients are detected in a given virtual queue, which is the case in the present scenario with queue 334 that comprises seven (7) queued end-users. Therefore, the VQSS system detects the problematic situation of queue 334 represented in the initial state (States 1) of FIG. 3.*b*, as described beforehand with reference to FIG. 2, because the queue 334 has seven (7) clients. The VQSS system then dynamically reassigns the 6th and 7th clients of the queue 334 to queues 330 and 332. The final status (State 2) of the queues 330, 332, and 334 is represented in FIG. 3.*b*, wherein each one of the virtual queues comprise five (5) end-users or less. Consequently, following the optimization process of the present invention, the maximum allowed number of clients per virtual queue that was set to five (5) is respected as shown in the final status (State 2) of FIG. 3.*b*.

Reference is now made to FIG. 3.*c*, which is yet another exemplary high-level logical representation of the virtual queue management process performed by the VQSS 102 according to the preferred embodiment of the present invention, wherein exceeding end-users of a priority virtual queue are assigned to other, shorter virtual queue(s). Shown in FIG. 3.*c* is an initial state (State 1) of three (3) virtual queues 350, 352, and 354 managed by the VQSS system. The first virtual queue 350 is a priority queue set by the administrator of the VQSS, i.e. a queue where end-users pay for receiving service, or where only end-users of a given category are accepted (e.g. VIP end-users). The queue 350 comprises four (4) clients whom service requests are to be treated by a service agent 360. The second virtual queue 352 is a regular queue and comprises six (6) clients whom service requests are to be treated by a service agent 362. Finally, the virtual queue 354 is another regular queue and comprises seven (7) clients, which service requests are to be treated by a service agent 364. It is also assumed, that the VQSS system that manages the virtual queues 350, 352, and 364 comprises a pre-set threshold that triggers the optimization process every time more than two (2) clients are detected in the priority queue 350, independent of the number of clients of the other queues. This is the case in the present exemplary scenario with the priority queue 350 that currently comprises four (4) queued end-users. Therefore, the VQSS system detects the problematic situation represented in the initial state (States 1) of FIG. 3.*c*, as described beforehand with reference to FIG. 2, because the queue 350 has four (4) clients. The VQSS system reassigns the $3^{rd}$ and $4^{th}$ clients of the priority queue 350 to the front of the regular queues 352 and 354. The final status (State 2) of the queues 350, 352, and 354 is represented in FIG. 3.*c*, wherein the priority queue comprises only two (2) end-users. Consequently, following the optimization process of the present invention, the maximum allowed number of clients for the priority queue 350 that was set to two (2) is respected as shown in the final status (State 2) of FIG. 3.*c*.

Reference is now made back to FIG. 1, wherein it is shown that according to the invention, each time a modification is made to a given virtual queue, such as for example when the processing of a client is terminated and the position of the following queued clients changes, or when the optimization process described herein changes the end-users' position in a given queue, etc, the VQSS system 102 issues a notification message 500 to the affected end-user, e.g end-user 106 to inform about the change. For example if the position of the user 106 changes from being 6$^{th}$ in a virtual queue to being 5$^{th}$ in the same or in other virtual queue, the end-user 106 is sent the notification 500, which is converted in the notification 502 by the interface 120, and relayed to the user 106 with the updated information regarding the new queue position of the user. It is understood that all end-users affected by a given change in a queue are to receive notifications alike notification 502.

Based upon the foregoing, it should now be apparent to those of ordinary skills in the art that the present invention provides an advantageous solution, which offers continuous optimization of a system comprising a plurality of virtual queues. Although the system and method of the present invention have been described in particular reference to certain exemplary scenarios, it should be realized upon reference hereto that the innovative teachings contained herein are not necessarily limited thereto and may be implemented advantageously in various ways. For example, although the invention was described with reference to assigning new service agents to certain problematic queues or re-assigning end-users to other queues, it should be understood that both the service agent assignment of the end-user re-assignment can be done concomitantly in order to optimize the service provision. It is believed that the operation and construction of the present invention will be apparent from the foregoing description. While the method and system shown and described have been characterized as being preferred, it will be readily apparent that various changes and modifications could be made therein without departing from the scope of the invention as defined by the claims set forth hereinbelow.

Although several preferred embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for optimizing end-user service using a Virtual Queuing Support System (VQSS), the method comprising the steps of:
   a) detecting a problematic situation associated with a virtual queue from a plurality of virtual queues, the problematic situation being indicative of a non-optimized service quality for an end-user service; and
   b) taking an action for correcting the problematic situation;
   wherein the action comprises reassigning at least one new service agent from one of the other queues of the plurality of virtual queues to the virtual queue associated with the problematic situation by:
   e.1) estimating a number of new service agents needed to correct the problematic situation;
   e.2) retrieving the number of new service agents from their correspondent current service; and
   e.3) reassigning the number of new service agents to the virtual queue associated with the problematic situation.

2. The method claimed in claim 1, wherein prior to step a), the method comprises the steps of:
   c) collecting virtual queue status information related to each virtual queue of the plurality of virtual queues, and agent status information; and
   d) calculating at least one quality parameter associated with each virtual queue of the plurality of virtual queues;
   wherein step a) comprising comparing the at least one quality parameter with at least one pre-set threshold.

3. The method claimed in claim 2, wherein the at least one quality parameter comprises an average queue speed of the virtual queue.

4. The method claimed in claim 2, wherein the at least one quality parameter comprises an average expected waiting time related to the last end-user of the virtual queue.

5. The method claimed in claim 2, wherein the virtual queue status information includes a number of registered end-users of a virtual queue.

6. The method claimed in claim 1, wherein step b) comprises the step of:
   reassigning at least one end-user of the virtual queue associated with the problematic situation to another virtual queue from the plurality of virtual queues.

7. The method claimed in claim 6, wherein the virtual queue associated with the problematic situation is a priority queue and wherein reassigning the at least one end-user of the virtual queue associated with the problematic situation to the other virtual queue comprises reassigning the at least one end-user to the front of the other virtual queue.

8. The method claimed in claim 1, wherein step e.1) comprises the step of estimating the number of new service agents needed to correct the problematic situation within a given period of time.

9. A Virtual Queuing Support System (VQSS) for optimizing end-user service, the VOSS comprising:
   a memory for storing a plurality of virtual queues; and
   a processor acting to detect a problematic situation associated with a virtual queue from a plurality of virtual queues and acting to take an action for correcting the problematic situation, the problematic situation being indicative of a non-optimized service quality for an end-user service;
   wherein the action taken by the processor comprises reassigning at least one new service agent from one of the other queues of the plurality of virtual queues to the virtual queue associated with the problematic situation, the processor further estimating a number of new service aqents needed to correct the problematic situation, retrieving the number of new service agents from their correspondent current service, and reassigning the number of new service agents to the virtual queue associated with the problematic situation.

10. The VQSS claimed in claim 9, wherein prior to detecting the problematic situation, the processor collects virtual queue status information related to each virtual queue of the plurality of virtual queues, as well as agent status information, and calculates at least one quality parameter associated with each virtual queue of the plurality of virtual queues;
    wherein for detecting the problematic situation, the processor compares the at least one quality parameter with at least one pre-set threshold.

11. The VOSS claimed in claim 10, wherein the at least one quality parameter comprises an average queue speed of the virtual queue.

12. The VQSS claimed in claim 10, wherein the at least one quality parameter comprises an average expected waiting time related to the last end-user of the virtual queue.

13. The VQSS claimed in claim 10, wherein the virtual queue status information includes a number of registered end-users of a virtual queue.

14. The VQSS claimed in claim 9, wherein the processor further reassigns at least one end-user of the virtual queue associated with the problematic situation to another virtual queue from the plurality of virtual queues.

15. The VQSS claimed in claim 14, wherein the virtual queue associated with the problematic situation is a priority queue and wherein the at least one end-user of the virtual queue associated with the problematic situation is reassigned to the front of the other virtual queue.

16. The VOSS claimed in claim 9, wherein the processor estimates the number of new service agents needed to correct the problematic situation within a given period of time.

* * * * *